United States Patent
Ito et al.

(10) Patent No.: US 9,439,541 B2
(45) Date of Patent: Sep. 13, 2016

(54) READY-TO-ASSEMBLE TOILET

(71) Applicant: DAIKI CO., LTD., Tokyo (JP)

(72) Inventors: Hiroshi Ito, Tokyo (JP); Junji Yoshinaga, Tokyo (JP)

(73) Assignee: DAIKI CO., LTD., Tokyo (JP)

( * ) Notice: Subject to any disclaimer, the term of this patent is extended or adjusted under 35 U.S.C. 154(b) by 169 days.

(21) Appl. No.: 14/340,063

(22) Filed: Jul. 24, 2014

(65) Prior Publication Data

US 2015/0289732 A1 Oct. 15, 2015

(30) Foreign Application Priority Data

Apr. 15, 2014 (JP) .................................. 2014-083365

(51) Int. Cl.
*A47K 11/02* (2006.01)

(52) U.S. Cl.
CPC ........................................ *A47K 11/02* (2013.01)

(58) Field of Classification Search
CPC ...... A47K 11/00; A47K 11/02; A47K 11/04; A47K 11/06
USPC ..................... 4/449, 460, 476, 479, 483, 484
See application file for complete search history.

(56) References Cited

U.S. PATENT DOCUMENTS

| | | | | | |
|---|---|---|---|---|---|
| 2,100,979 A | * | 11/1937 | Rowe | ..................... | A47C 5/005 297/440.12 |
| 2,849,726 A | * | 9/1958 | Vay | ........................ | A47K 11/02 229/112 |
| 3,097,016 A | * | 7/1963 | Bigler, Jr. | .............. | A47C 5/005 297/440.12 |
| 3,118,146 A | * | 1/1964 | Dorey | .................... | A47K 11/02 229/117.35 |
| 3,600,719 A | * | 8/1971 | Karr | ....................... | A47K 11/02 4/144.2 |
| 4,995,122 A | * | 2/1991 | Mohnhaupt | ........... | A47K 11/02 4/451 |
| 5,040,249 A | * | 8/1991 | Diaz | ..................... | A47C 5/005 4/460 |
| 5,524,301 A | * | 6/1996 | McGuire | ............... | A47K 11/02 4/449 |
| 5,682,623 A | * | 11/1997 | Fenoglio | ............... | A47K 11/02 297/440.12 |
| 5,732,418 A | * | 3/1998 | Sekitou | ................... | A47K 11/02 229/125.17 |
| 6,047,414 A | * | 4/2000 | Bailey | .................... | A47K 11/02 4/484 |
| 2009/0038066 A1 | * | 2/2009 | Kallmann | ............. | A47K 11/02 4/479 |
| 2009/0172872 A1 | * | 7/2009 | Macey | ................... | A47K 11/06 4/451 |

(Continued)

FOREIGN PATENT DOCUMENTS

JP   A-2008-104558       5/2008
JP      2009000425     *  1/2009 ............. A47K 11/04

*Primary Examiner* — J. Casimer Jacyna
(74) *Attorney, Agent, or Firm* — Oliff PLC

(57) ABSTRACT

The present invention provides a ready-to-assemble toilet having excellent strength. The ready-to-assemble toilet includes an outer box member, and first and second inner box members. The outer box member and the inner box members are made of corrugated board or cardboard. The outer box member includes a bottom portion and first to fourth sidewall portions. The inner box members each include first to fourth sidewall portions and a top portion. The height of the inner box members is substantially equal to the height of the outer box member. The first and second inner box members are arranged in the outer box member such that the first sidewall portions thereof respectively face the first and second sidewall portions of the outer box member. The inner box members are spaced apart from each other in the outer box member, and excrement is collected in a space formed therebetween.

25 Claims, 8 Drawing Sheets

(56) References Cited

U.S. PATENT DOCUMENTS

2009/0255046 A1* 10/2009 Carter .................... A47K 11/06
    4/484
2010/0058527 A1* 3/2010 Richardson ............ A47K 11/02
    4/483
2010/0269249 A1* 10/2010 Wharton ................ A47K 11/02
    4/479
2010/0275362 A1* 11/2010 Biesinger ............... A47K 11/02
    4/483
2012/0192343 A1* 8/2012 Richardson ............ A47K 11/02
    4/449
2013/0139311 A1* 6/2013 Shaw ..................... A47K 11/02
    4/479
2013/0227776 A1* 9/2013 Ito .......................... A47K 11/02
    4/479

* cited by examiner

READY-TO-ASSEMBLE TOILET

CROSS REFERENCE TO RELATED APPLICATION

This application is based on Japanese patent application No. 2014-083365 filed Apr. 15, 2014, the content of which is hereby incorporated by reference.

BACKGROUND OF THE INVENTION

1. Field of the Invention

The present invention relates to a ready-to-assemble toilet made of paper.

2. Description of the Related Art

A conventional ready-to-assemble toilet is disclosed in, for example, JP 2008-104558A. The ready-to-assemble toilet disclosed in this document includes an outer box having a bottom portion and four sidewall portions, and an inner box having four sidewall portions. The outer box and the inner box are both made of corrugated board. The inner box is arranged in the outer box such that the inner box is spaced apart from the sidewall portions of the outer box. The inner box is internally provided with a plastic bag for accommodating excrement. A toilet seat portion is provided on the top of the outer box.

In the above-described ready-to-assemble toilet, each sidewall is constituted by a sidewall portion of the outer box and a sidewall portion of the inner box. With the double-wall sidewalls, the strength of the toilet can be enhanced to a certain degree. However, there is still room for improvement in such a ready-to-assemble toilet in terms of strength.

SUMMARY OF THE INVENTION

The present invention has been made in view of the above-described circumstances, and it is an object of the present invention to provide a ready-to-assemble toilet having excellent strength.

A ready-to-assemble toilet according to the present invention is a ready-to-assemble toilet including: an outer box member that is made of corrugated board or cardboard and includes a bottom portion, a first sidewall portion, a second sidewall portion that faces the first sidewall portion, a third sidewall portion, and a fourth sidewall portion that faces the third sidewall portion; and a first inner box member and a second inner box member that are made of corrugated board or cardboard and which both include a first sidewall portion, a second sidewall portion that faces the first sidewall portion, a third sidewall portion, a fourth sidewall portion that faces the third sidewall portion, and a top portion, wherein the first and second inner box members have a height that is substantially equal to a height of the outer box member, the first inner box member is arranged in the outer box member such that the first sidewall portion thereof faces the first sidewall portion of the outer box member, the second inner box member is arranged in the outer box member such that the first sidewall portion thereof faces the second sidewall portion of the outer box member, the first and second inner box members are spaced apart from each other in the outer box member, and a space between the first inner box member and the second inner box member is configured to receive excrement.

In the ready-to-assemble toilet, the first and second inner box members are arranged so as to be spaced apart from each other and respectively face the first and second sidewall portions of the outer box member. In other words, the inner box members are arranged on opposite sides of the outer box member with a space for collecting excrement interposed therebetween. Accordingly, the first and second sidewall portions of each inner box member and a sidewall portion of the outer box member together constitute a sidewall of the toilet. By configuring the sidewalls of the toilet to have such a three-wall structure as described above, the strength of the toilet can be remarkably enhanced.

According to the present invention, it is possible to implement a ready-to-assemble toilet having excellent strength.

DESCRIPTION OF THE PREFERRED EMBODIMENTS

Figure 1:
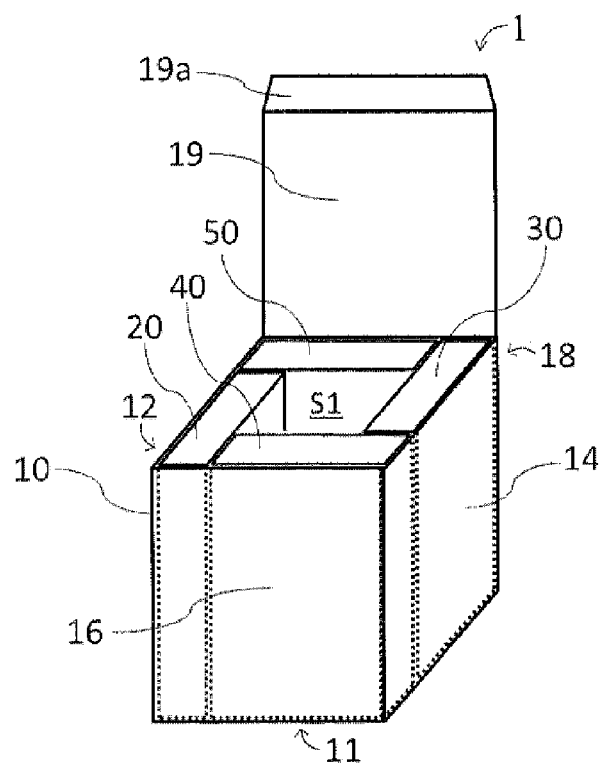
FIG. 1 is a perspective view of a ready-to-assemble toilet according to an embodiment of the present invention.

Hereinafter, embodiments of the present invention will be described in detail with reference to the drawings. When referring to the drawings, the same elements are given the same reference numerals, and thus a duplicate description is omitted.

Figure 2:
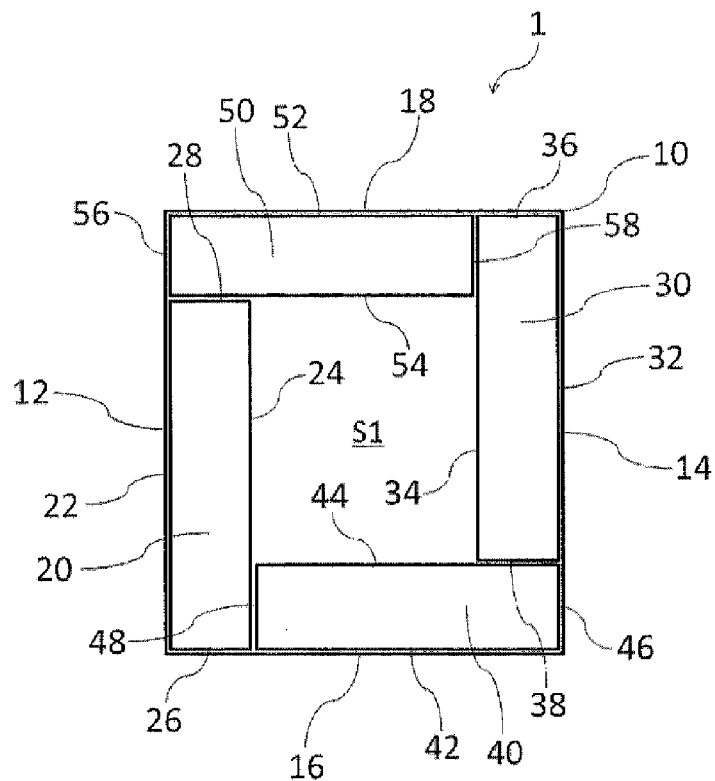
FIG. 2 is a plan view of the ready-to-assemble toilet shown in FIG. 1.

FIG. 1 is a perspective view of a ready-to-assemble toilet according to an embodiment of the present invention. FIG. 2 is a plan view of the ready-to-assemble toilet shown in FIG. 1. The ready-to-assemble toilet 1 includes an outer box member 10, an inner box member 20 (first inner box member), an inner box member 30 (second inner box member), an inner box member 40 (third inner box member), and an inner box member 50 (fourth inner box member). The inner box members 20, 30, 40 and 50 are disposed in the outer box member 10. The outer box member 10 and the inner box members 20, 30, 40 and 50 are made of corrugated board or cardboard.

The outer box member 10 has a rectangular prism-shape including a bottom portion 11, a sidewall portion 12 (first sidewall portion), a sidewall portion 14 (second sidewall portion), a sidewall portion 16 (third sidewall portion), and a sidewall portion 18 (fourth sidewall portion). In the present embodiment, the outer box member 10 also includes a top portion 19. The top portion 19 functions as a lid of the ready-to-assemble toilet 1. The outer box member 10 is sized to have, for example, a width (the horizontal length of each of the sidewall portions 16 and 18) of about 45 cm, a depth (the horizontal length of each of the sidewall portions 12 and 14) of about 50 cm, and a height (the height of each of the sidewall portions 12, 14, 16 and 18) of about 50 cm.

Figure 3:
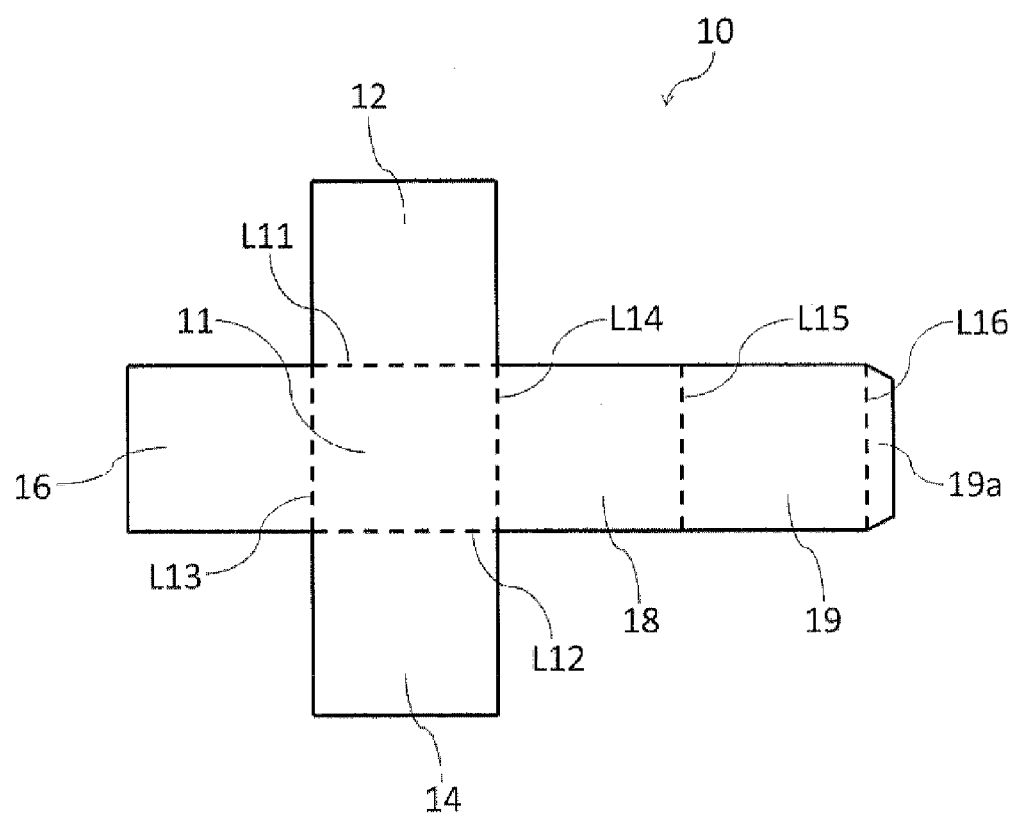
FIG. 3 is a plan view of an outer box member 10 before being assembled.

FIG. 3 is a plan view of the outer box member 10 before being assembled. This diagram shows the internal side of the outer box member 10. The outer box member 10 is formed from a single sheet of flat corrugated board or cardboard. A folding line L11 is formed at the boundary between the bottom portion 11 and the sidewall portion 12. A folding line L12 is formed at the boundary between the bottom portion 11 and the sidewall portion 14. A folding line L13 is formed at the boundary between the bottom portion 11 and the sidewall portion 16. A folding line L14 is formed at the boundary between the bottom portion 11 and the sidewall portion 18. The outer box member 10 can be assembled by folding along the folding lines L11 to L14. To be specific, the rectangular prism-shaped outer box member 10 shown in FIG. 1 is obtained by folding along the folding lines L11 to L14 to form valley folds having a substantially right angle. The sidewall portions 12, 14, 16 and 18 are fixed to each other by an appropriate means (for example, by bonding them together with gummed tape).

Figure 4:
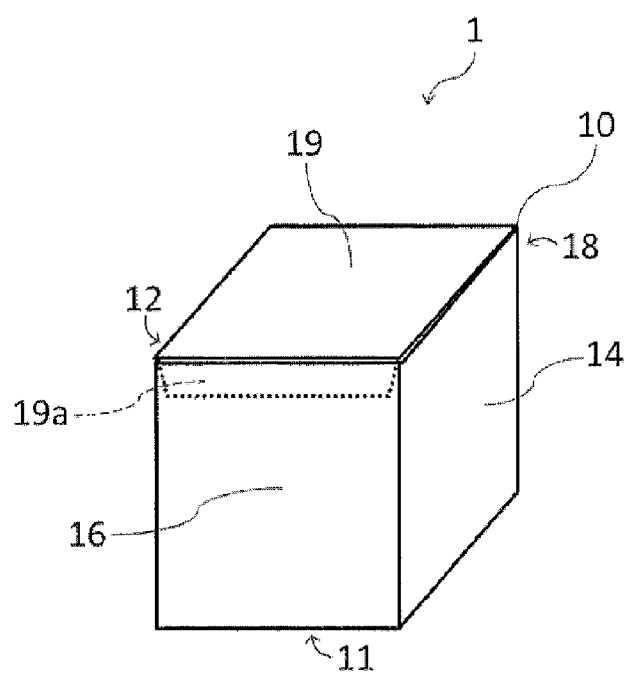
FIG. 4 is a perspective view of the ready-to-assemble toilet shown in FIG. 1 with a lid (top portion 19) being closed.

Furthermore, a folding line L15 is formed at the boundary between the sidewall portion 18 and the top portion 19. One side (the side opposite to the sidewall portion 18) of the top portion 19 is connected to a tab portion 19a. A folding line L16 is formed at the boundary between the tab portion 19a and the top portion 19. After folding along the folding lines L11 to L14, valley folds having a substantially right angle are formed by folding along the folding lines L15 and L16. Then, as shown in FIG. 4, the lid (the top portion 19) of the ready-to-assemble toilet 1 can be closed. At this time, the tab portion 19a is inserted between the sidewall portion 18 and the inner box members 20 and 40 (see FIG. 1) so as to prevent the lid from opening by itself.

Figure 5:
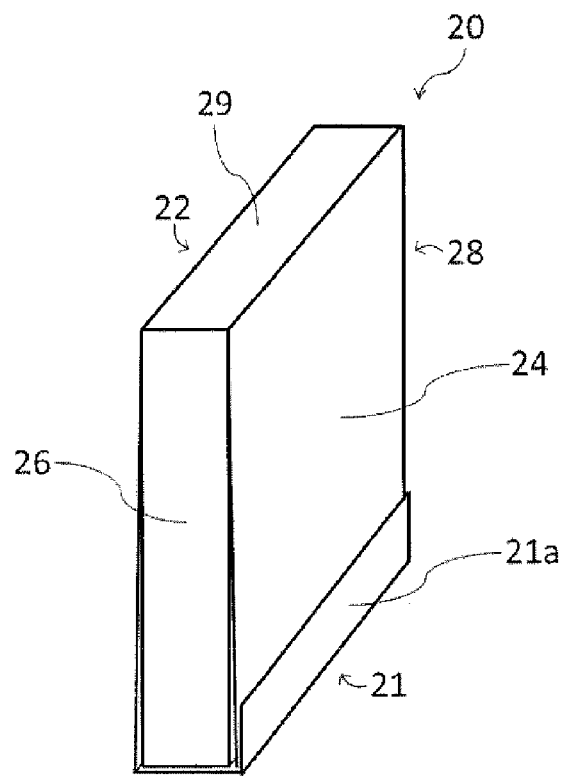
FIG. 5 is a perspective view of an inner box member 20.

FIG. 5 is a perspective view of the inner box member 20. The inner box member 20 has a rectangular prism-shape including a sidewall portion 22 (first sidewall portion), a sidewall portion 24 (second sidewall portion), a sidewall portion 26 (third sidewall portion), a sidewall portion 28 (fourth sidewall portion), and a top portion 29. In the present embodiment, the inner box member 20 also includes a bottom portion 21. The inner box member 20 is sized to have, for example, a width (the horizontal length of each of the sidewall portions 26 and 28) of about 10 cm, a depth (the horizontal length of each of the sidewall portions 22 and 24) of about 40 cm, and a height (the height of each of the sidewall portions 22, 24, 26 and 28) of about 50 cm. The height of the inner box member 20 is substantially equal to the height of the outer box member 10. The horizontal length of each of the sidewall portions 22 and 24 is longer than the horizontal length of each of the sidewall portions 26 and 28.

Figure 6:
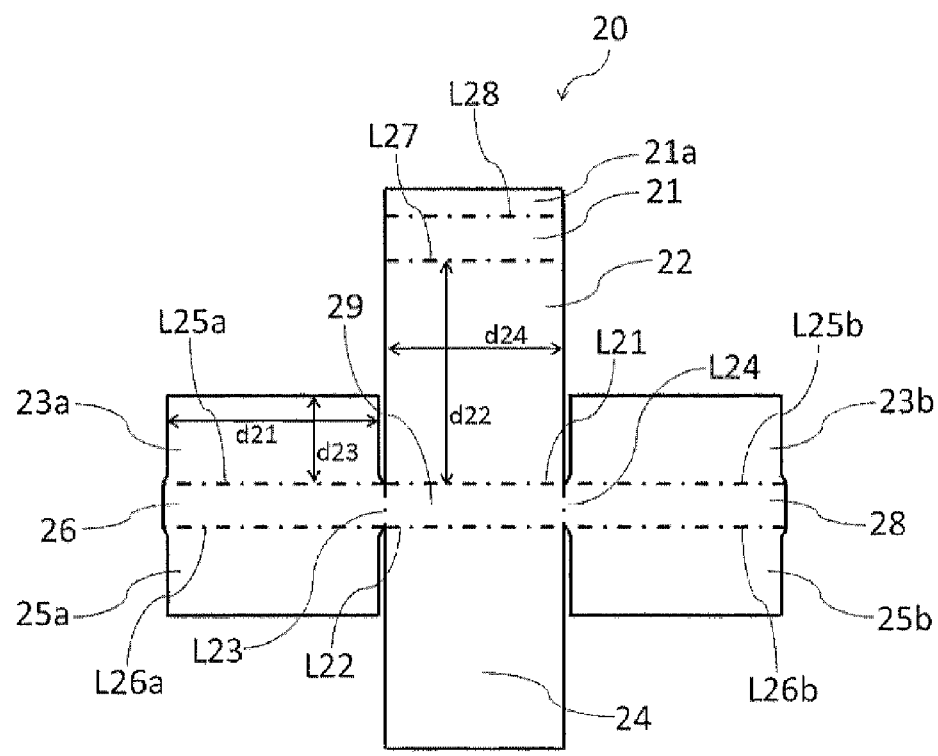
FIG. 6 is a plan view of the inner box member 20 before being assembled.

FIG. 6 is a plan view of the inner box member 20 before being assembled. This diagram shows the external side of the inner box member 20. The inner box member 20 is formed from a single sheet of flat corrugated board or cardboard. A folding line L21 is formed at the boundary between the top portion 29 and the sidewall portion 22. A folding line L22 is formed at the boundary between the top portion 29 and the sidewall portion 24. A folding line L23 is formed at the boundary between the top portion 29 and the sidewall portion 26. A folding line L24 is formed at the boundary between the top portion 29 and the sidewall portion 28.

A reinforcing portion 23a (first reinforcing portion) and a reinforcing portion 25a (second reinforcing portion) are connected respectively to opposite sides of the sidewall portion 26. A folding line L25a is formed at the boundary between the sidewall portion 26 and the reinforcing portion 23a. A folding line L26a is formed at the boundary between the sidewall portion 26 and the reinforcing portion 25a. Likewise, a reinforcing portion 23b (first reinforcing portion) and a reinforcing portion 25b (second reinforcing portion) are connected respectively to opposite sides of the sidewall portion 28. A folding line L25b is formed at the boundary between the sidewall portion 28 and the reinforcing portion 23b. A folding line L26b is formed at the boundary between the sidewall portion 28 and the reinforcing portion 25b.

The reinforcing portions 23a, 23b, 25a and 25b each have a height d21 that is substantially equal to a height d22 of each of the sidewall portions 22, 24, 26 and 28. However, in order to facilitate assembling, the height d21 is designed to be slightly shorter than the height d22. Also, the reinforcing portions 23a, 23b, 25a and 25b each have a horizontal length d23 that is substantially equal to one-half a horizontal length d24 of each of the sidewall portions 22 and 24.

Furthermore, a folding line L27 is formed at the boundary between the sidewall portion 22 and the bottom portion 21. One side (the side opposite to the sidewall portion 22) of the bottom portion 21 is connected to a glue tab portion 21a. A folding line L28 is formed at the boundary between the glue tab portion 21a and the bottom portion 21.

The inner box member 20 can be assembled by folding along the folding lines L21 to L28. To be specific, first, mountain folds having a substantially right angle are formed by folding along the folding lines L23, L24, L25a, L25b, L26a and L26b. Next, mountain folds having a substantially right angle are formed by folding along the folding lines L21, L22 and L27. Finally, a mountain fold having a substantially right angle is formed by folding along the folding line L28. By doing so, the rectangular prism-shaped inner box member 20 shown in FIG. 5 is obtained. The glue tab portion 21a can be fixed to the sidewall portion 24 with an adhesive, gummed tape or the like. The sidewall portions 22, 24, 26 and 28 can be fixed to each other by an appropriate means.

At this time, the reinforcing portions 23a and 23b overlap the internal surface of the sidewall portion 22. To be specific, substantially the entirety of the internal surface of the sidewall portion 22 is covered by the reinforcing portions 23a and 23b. Likewise, the reinforcing portions 25a and 25b overlap the internal surface of the sidewall portion 24. To be specific, substantially the entirety of the internal surface of the sidewall portion 24 is covered by the reinforcing portions 25a and 25b. The sidewall portion 22 may be bonded to each of the reinforcing portions 23a and 23b. Likewise, the sidewall portion 24 may be bonded to each of the reinforcing portions 25a and 25b. An adhesive or double-sided tape may be used to bond these portions.

Figure 7:
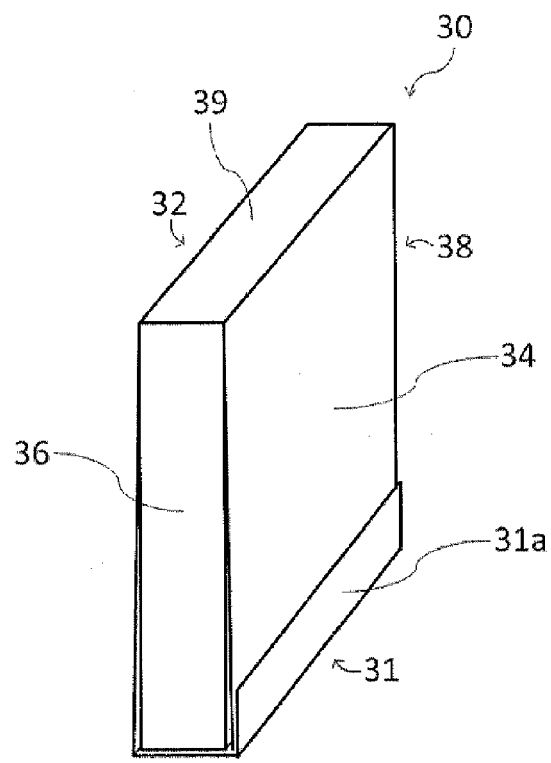
FIG. 7 is a perspective view of an inner box member 30.

FIG. 7 is a perspective view of the inner box member 30. The inner box member 30 has a rectangular prism-shape including a sidewall portion 32 (first sidewall portion), a sidewall portion 34 (second sidewall portion), a sidewall portion 36 (third sidewall portion), a sidewall portion 38 (fourth sidewall portion), and a top portion 39. In the present embodiment, the inner box member 30 also includes a bottom portion 31. The inner box member 30 is sized to have, for example, a width (the horizontal length of each of the sidewall portions 36 and 38) of about 10 cm, a depth (the horizontal length of each of the sidewall portions 32 and 34) of about 40 cm, and a height (the height of each of the sidewall portions 32, 34, 36 and 38) of about 50 cm. The height of the inner box member 30 is substantially equal to the height of the outer box member 10. The horizontal length of each of the sidewall portions 32 and 34 is longer than the horizontal length of each of the sidewall portions 36 and 38. In the present embodiment, the inner box member 20 and the inner box member 30 have a substantially equal shape and size.

Figure 8:
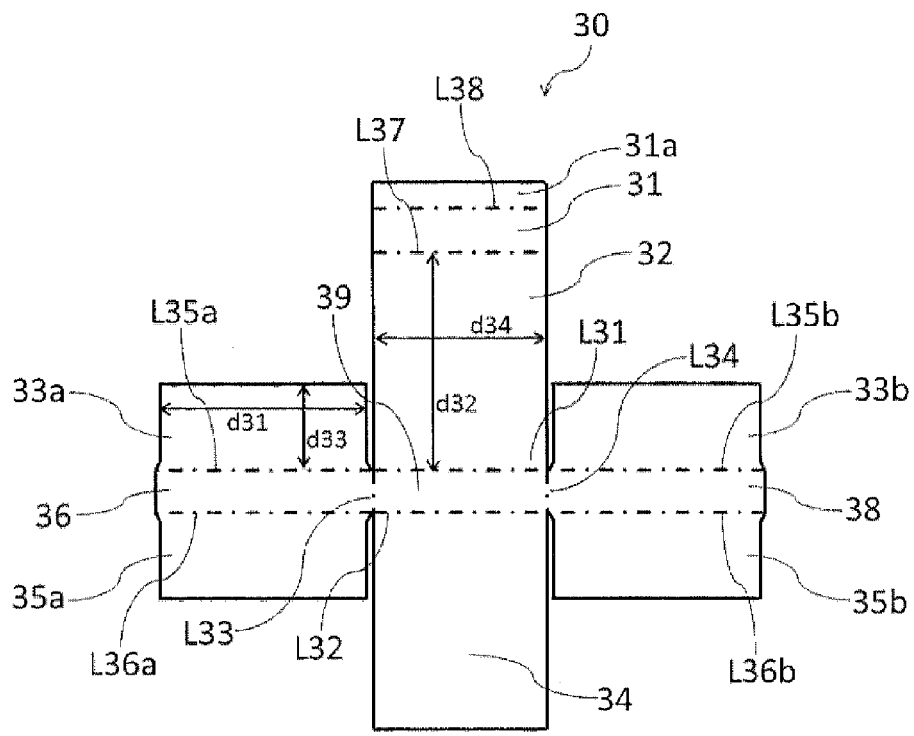
FIG. 8 is a plan view of the inner box member 30 before being assembled.

FIG. 8 is a plan view of the inner box member 30 before being assembled. This diagram shows the external side of the inner box member 30. The inner box member 30 is formed from a single sheet of flat corrugated board or cardboard. A folding line L31 is formed at the boundary between the top portion 39 and the sidewall portion 32. A folding line L32 is formed at the boundary between the top portion 39 and the sidewall portion 34. A folding line L33 is formed at the boundary between the top portion 39 and the sidewall portion 36. A folding line L34 is formed at the boundary between the top portion 39 and the sidewall portion 38.

A reinforcing portion 33a (first reinforcing portion) and a reinforcing portion 35a (second reinforcing portion) are connected respectively to opposite sides of the sidewall portion 36. A folding line L35a is formed at the boundary between the sidewall portion 36 and the reinforcing portion 33a. A folding line L36a is formed at the boundary between the sidewall portion 36 and the reinforcing portion 35a. Likewise, a reinforcing portion 33b (first reinforcing portion) and a reinforcing portion 35b (second reinforcing portion) are connected respectively to opposite sides of the sidewall portion 38. A folding line L35b is formed at the boundary between the sidewall portion 38 and the reinforcing portion 33b. A folding line L36b is formed at the boundary between the sidewall portion 38 and the reinforcing portion 35b.

The reinforcing portions 33a, 33b, 35a and 35b each have a height d31 that is substantially equal to a height d32 of each of the sidewall portions 32, 34, 36 and 38. However, in order to facilitate assembling, the height d31 is designed to be slightly shorter than the height d32. Also, the reinforcing portions 33a, 33b, 35a and 35b each have a horizontal length d33 that is substantially equal to one-half a horizontal length d34 of each of the sidewall portions 32 and 34.

Furthermore, a folding line L37 is formed at the boundary between the sidewall portion 32 and the bottom portion 31. One side (the side opposite to the sidewall portion 32) of the bottom portion 31 is connected to a glue tab portion 31a. A folding line L38 is formed at the boundary between the glue tab portion 31a and the bottom portion 31.

The inner box member 30 can be assembled by folding along the folding lines L31 to L38 as described above. To be specific, first, mountain folds having a substantially right angle are formed by folding along the folding lines L33, L34, L35a, L35b, L36a and L36b. Next, mountain folds having a substantially right angle are formed by folding along the folding lines L31, L32 and L37. Finally, a mountain fold having a substantially right angle is formed by folding along the folding line L38. By doing so, the rectangular prism-shaped inner box member 30 shown in FIG. 7 is obtained. The glue tab portion 31a can be fixed to the sidewall portion 34 with an adhesive, gummed tape or the like. The sidewall portions 32, 34, 36 and 38 can be fixed to each other by an appropriate means.

At this time, the reinforcing portions 33a and 33b overlap the internal surface of the sidewall portion 32. To be specific, substantially the entirety of the internal surface of the sidewall portion 32 is covered by the reinforcing portions 33a and 33b. Likewise, the reinforcing portions 35a and 35b overlap the internal surface of the sidewall portion 34. To be specific, substantially the entirety of the internal surface of the sidewall portion 34 is covered by the reinforcing portions 35a and 35b. The sidewall portion 32 may be bonded to each of the reinforcing portions 33a and 33b. Likewise, the sidewall portion 34 may be bonded to each of the reinforcing portions 35a and 35b. An adhesive or double-sided tape, for example, may be used to bond these portions.

Figure 9:
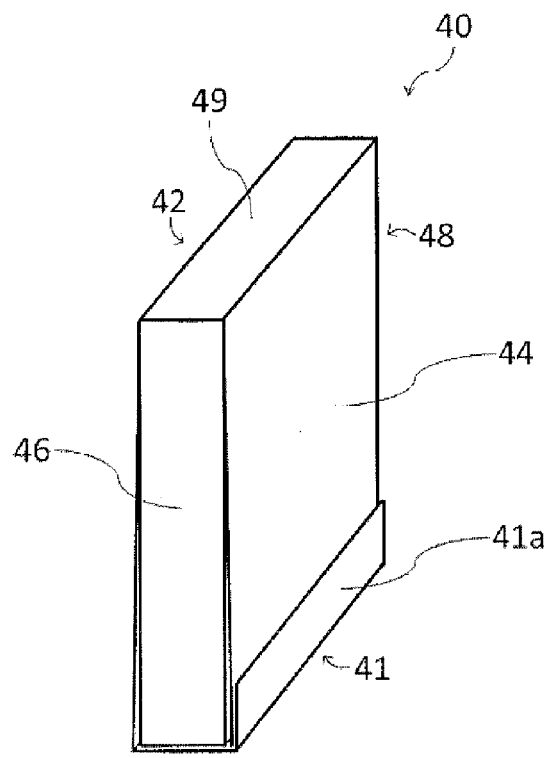
FIG. 9 is a perspective view of an inner box member 40.

FIG. 9 is a perspective view of the inner box member 40. The inner box member 40 has a rectangular prism-shape including a sidewall portion 42 (first sidewall portion), a sidewall portion 44 (second sidewall portion), a sidewall portion 46 (third sidewall portion), a sidewall portion 48 (fourth sidewall portion), and a top portion 49. In the present embodiment, the inner box member 40 also includes a bottom portion 41. The inner box member 40 is sized to have, for example, a width (the horizontal length of each of the sidewall portions 46 and 48) of about 10 cm, a depth (the horizontal length of each of the sidewall portions 42 and 44) of about 35 cm, and a height (the height of each of the sidewall portions 42, 44, 46 and 48) of about 50 cm. The height of the inner box member 40 is substantially equal to the height of the outer box member 10. The horizontal length of each of the sidewall portions 42 and 44 is longer than the horizontal length of each of the sidewall portions 46 and 48.

Figure 10:
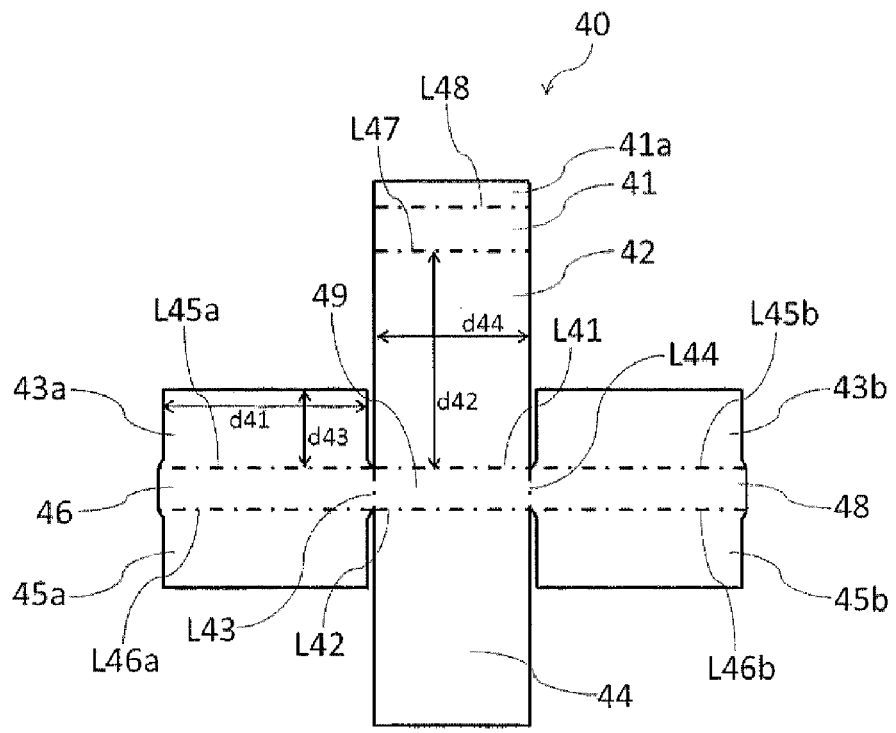
FIG. 10 is a plan view of the inner box member 40 before being assembled.

FIG. 10 is a plan view of the inner box member 40 before being assembled. This diagram shows the external side of the inner box member 40. The inner box member 40 is formed from a single sheet of flat corrugated board or cardboard. A folding line L41 is formed at the boundary between the top portion 49 and the sidewall portion 42. A folding line L42 is formed at the boundary between the top portion 49 and the sidewall portion 44. A folding line L43 is formed at the boundary between the top portion 49 and the sidewall portion 46. A folding line L44 is formed at the boundary between the top portion 49 and the sidewall portion 48.

A reinforcing portion 43a (first reinforcing portion) and a reinforcing portion 45a (second reinforcing portion) are connected respectively to opposite sides of the sidewall portion 46. A folding line L45a is formed at the boundary between the sidewall portion 46 and the reinforcing portion 43a. A folding line L46a is formed at the boundary between the sidewall portion 46 and the reinforcing portion 45a. Likewise, a reinforcing portion 43b (first reinforcing portion) and a reinforcing portion 45b (second reinforcing portion) are connected respectively to opposite sides of the sidewall portion 48. A folding line L45b is formed at the boundary between the sidewall portion 48 and the reinforcing portion 43b. A folding line L46b is formed at the boundary between the sidewall portion 48 and the reinforcing portion 45b.

The reinforcing portions 43a, 43b, 45a and 45b each have a height d41 that is substantially equal to a height d42 of each of the sidewall portions 42, 44, 46 and 48. However, in order to facilitate assembling, the height d41 is designed to be slightly shorter than the height d42. Also, the reinforcing portions 43a, 43b, 45a and 45b each have a horizontal length d43 that is substantially equal to one-half a horizontal length d44 of each of the sidewall portions 42 and 44.

Furthermore, a folding line L47 is formed at the boundary between the sidewall portion 42 and the bottom portion 41. One side (the side opposite to the sidewall portion 42) of the bottom portion 41 is connected to a glue tab portion 41a. A folding line L48 is formed at the boundary between the glue tab portion 41a and the bottom portion 41.

The inner box member 40 can be assembled by folding along the folding lines L41 to L48 as described above. To be specific, first, mountain folds having a substantially right angle are formed by folding along the folding lines L43, L44, L45a, L45b, L46a and L46b. Next, mountain folds having a substantially right angle are formed by folding along the folding lines L41, L42 and L47. Finally, a mountain fold having a substantially right angle is formed by folding along the folding line L48. By doing so, the rectangular prism-shaped inner box member 40 as shown in FIG. 9 is obtained. The glue tab portion 41a can be fixed to the sidewall portion 44 with an adhesive, gummed tape or the like. The sidewall portions 42, 44, 46 and 48 can be fixed to each other by an appropriate means.

At this time, the reinforcing portions 43a and 43b overlap the internal surface of the sidewall portion 42. To be specific, substantially the entirety of the internal surface of the sidewall portion 42 is covered by the reinforcing portions 43a and 43b. Likewise, the reinforcing portions 45a and 45b overlap the internal surface of the sidewall portion 44. To be specific, substantially the entirety of the internal surface of the sidewall portion 44 is covered by the reinforcing portions 45a and 45b. The sidewall portion 42 may be bonded to each of the reinforcing portions 43a and 43b. Likewise, the sidewall portion 44 may be bonded to each of the reinforcing portions 45a and 45b. An adhesive or double-sided tape, for example, may be used to bond these portions.

Figure 11:
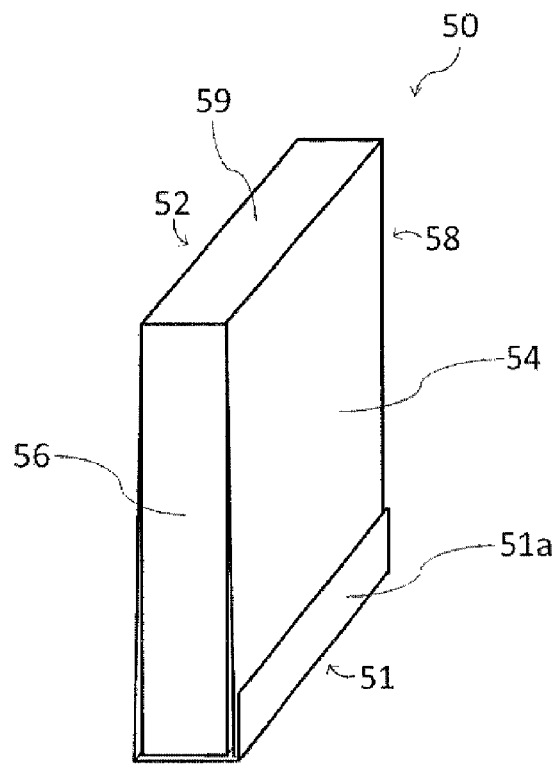
FIG. 11 is a perspective view of an inner box member 50.

FIG. 11 is a perspective view of the inner box member 50. The inner box member 50 has a rectangular prism-shape including a sidewall portion 52 (first sidewall portion), a sidewall portion 54 (second sidewall portion), a sidewall portion 56 (third sidewall portion), a sidewall portion 58 (fourth sidewall portion), and a top portion 59. In the present embodiment, the inner box member 50 also includes a bottom portion 51. The inner box member 50 is sized to have, for example, a width (the horizontal length of each of the sidewall portions 56 and 58) of about 10 cm, a depth (the horizontal length of each of the sidewall portions 52 and 54) of about 35 cm, and a height (the height of each of the sidewall portions 52, 54, 56 and 58) of about 50 cm. The height of the inner box member 50 is substantially equal to the height of the outer box member 10. The horizontal length of each of the sidewall portions 52 and 54 is longer than the horizontal length of each of the sidewall portions 56 and 58. In the present embodiment, the inner box member 40 and the inner box member 50 have a substantially equal shape and size.

Figure 12:
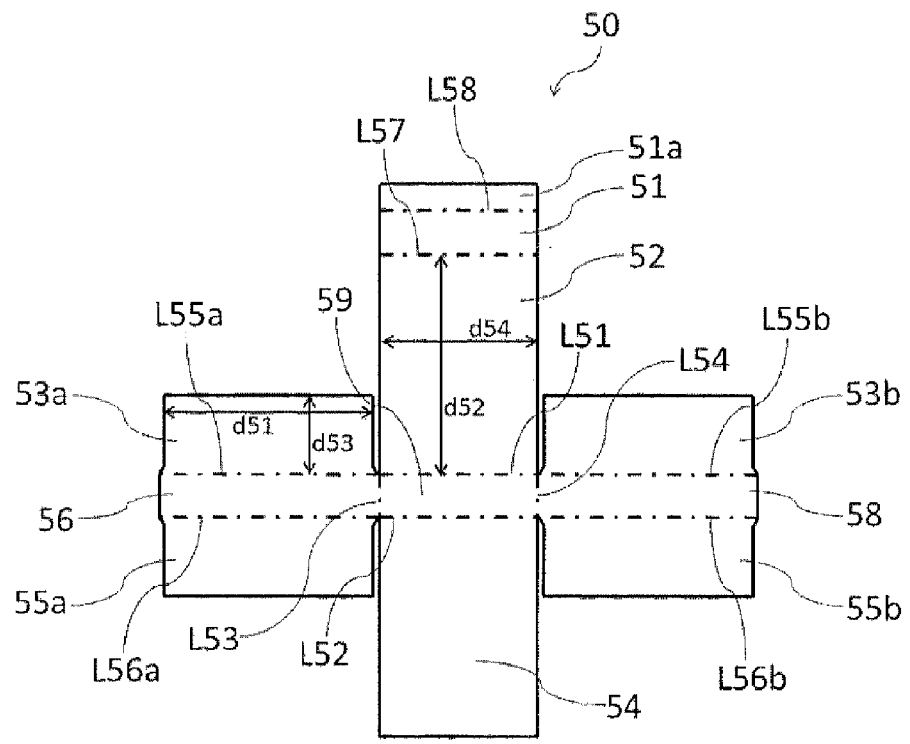
FIG. 12 is a plan view of the inner box member 50 before being assembled.

FIG. 12 is a plan view of the inner box member 50 before being assembled. This diagram shows the external side of the inner box member 50. The inner box member 50 is formed from a single sheet of flat corrugated board or cardboard. A folding line L51 is formed at the boundary between the top portion 59 and the sidewall portion 52. A folding line L52 is formed at the boundary between the top portion 59 and the sidewall portion 54. A folding line L53 is formed at the boundary between the top portion 59 and the sidewall portion 56. A folding line L54 is formed at the boundary between the top portion 59 and the sidewall portion 58.

A reinforcing portion 53a (first reinforcing portion) and a reinforcing portion 55a (second reinforcing portion) are connected respectively to opposite sides of the sidewall portion 56. A folding line L55a is formed at the boundary between the sidewall portion 56 and the reinforcing portion 53a. Also, a folding line L56a is formed at the boundary between the sidewall portion 56 and the reinforcing portion 55a. Likewise, a reinforcing portion 53b (first reinforcing portion) and a reinforcing portion 55b (second reinforcing portion) are connected respectively to opposite sides of the sidewall portion 58. A folding line L55b is formed at the boundary between the sidewall portion 58 and the reinforcing portion 53b. Also, a folding line L56b is formed at the boundary between the sidewall portion 58 and the reinforcing portion 55b.

The reinforcing portions 53a, 53b, 55a and 55b each have a height d51 that is substantially equal to a height d52 of each of the sidewall portions 52, 54, 56 and 58. However, in order to facilitate assembling, the height d51 is designed to be slightly shorter than the height d52. Also, the reinforcing portions 53a, 53b, 55a and 55b each have a horizontal length d53 that is substantially equal to one-half a horizontal length d54 of each of the sidewall portions 52 and 54.

Furthermore, a folding line L57 is formed at the boundary between the sidewall portion 52 and the bottom portion 51. One side (the side opposite to the sidewall portion 52) of the bottom portion 51 is connected to a glue tab portion 51a. A folding line L58 is formed at the boundary between the glue tab portion 51a and the bottom portion 51.

The inner box member 50 can be assembled by folding along the folding lines L51 to L58 as described above. To be specific, first, mountain folds having a substantially right angle are formed by folding along the folding lines L53, L54, L55a, L55b, L56a and L56b. Next, mountain folds having a substantially right angle are formed by folding along the folding lines L51, L52 and L57. Finally, a mountain fold having a substantially right angle is formed by folding along the folding line L58. By doing so, the rectangular prism-shaped inner box member 50 as shown in FIG. 11 is obtained. The glue tab portion 51a can be fixed to the sidewall portion 54 with an adhesive, gummed tape or the like. The sidewall portions 52, 54, 56 and 58, can be fixed to each other by an appropriate means.

At this time, the reinforcing portions 53a and 53b overlap the internal surface of the sidewall portion 52. To be specific, substantially the entirety of the internal surface of the sidewall portion 52 is covered by the reinforcing portions 53a and 53b. Likewise, the reinforcing portions 55a and 55b overlap the internal surface of the sidewall portion 54. To be specific, substantially the entirety of the internal surface of the sidewall portion 54 is covered by the reinforcing portions 55a and 55b. The sidewall portion 52 may be bonded to each of the reinforcing portions 53a and 53b. Likewise, the sidewall portion 54 may be bonded to each of the reinforcing portions 55a and 55b. An adhesive or double-sided tape, for example, may be used to bond these portions.

Returning to FIGS. 1 and 2, the inner box member 20 is arranged along the sidewall portion 12 of the outer box member 10. To be specific, the inner box member 20 is arranged in the outer box member 10 such that the sidewall portion 22 faces the sidewall portion 12 of the outer box member 10. Substantially the entirety of the sidewall portion 22 of the inner box member 20 is in contact with the sidewall portion 12 of the outer box member 10. Likewise, the inner box member 30 is arranged along the sidewall portion 14 of the outer box member 10. To be specific, the inner box member 30 is arranged in the outer box member 10 such that the sidewall portion 32 faces the sidewall portion 14 of the outer box member 10. Substantially the entirety of the sidewall portion 32 of the inner box member 30 is in contact with the sidewall portion 14 of the outer box member 10. The inner box member 20 and the inner box member 30 are spaced apart from each other in the outer box member 10. The inner box member 20 and the inner box member 30 may be fixed to the sidewall portion 12 and the sidewall portion 14, respectively. An adhesive or double-sided tape, for example, may be used to affix these portions.

Furthermore, the inner box member 40 is arranged along the sidewall portion 16 of the outer box member 10. To be specific, the inner box member 40 is arranged in the outer box member 10 such that the sidewall portion 42 faces the sidewall portion 16 of the outer box member 10. Substantially the entirety of the sidewall portion 42 of the inner box member 40 is in contact with the sidewall portion 16 of the outer box member 10. Likewise, the inner box member 50 is arranged along the sidewall portion 18 of the outer box member 10. To be specific, the inner box member 50 is arranged in the outer box member 10 such that the sidewall portion 52 faces the sidewall portion 18 of the outer box member 10. Substantially the entirety of the sidewall portion 52 of the inner box member 50 is in contact with the sidewall portion 18 of the outer box member 10. The inner box member 40 and the inner box member 50 are spaced apart from each other in the outer box member 10.

The inner box members 20, 30, 40 and 50 are point-symmetrically arranged in the outer box member 10 as viewed from above. That is, the inner box member 20 is arranged such that the sidewall portion 26 is in contact with the sidewall portion 16 of the outer box member 10, and the sidewall portion 28 is in contact with the sidewall portion 54 of the inner box member 50. The inner box member 30 is arranged such that the sidewall portion 36 is in contact with the sidewall portion 18 of the outer box member 10, and the sidewall portion 38 is in contact with the sidewall portion 44 of the inner box member 40. The inner box member 40 is arranged such that the sidewall portion 46 is in contact with the sidewall portion 14 of the outer box member 10, and the sidewall portion 48 is in contact with the sidewall portion 24 of the inner box member 20. The inner box member 50 is arranged such that the sidewall portion 56 is in contact with the sidewall portion 12 of the outer box member 10, and the sidewall portion 58 is in contact with the sidewall portion 34 of the inner box member 30.

Also, the inner box members 20, 30, 40 and 50 are arranged along the sidewall portions 12, 14, 16 and 18 of the outer box member 10 with substantially no space therebetween. That is, substantially the entirety of the sidewall portion 12 is covered by the sidewall portion 22 of the inner box member 20 and the sidewall portion 56 of the inner box member 50. Substantially the entirety of the sidewall portion 14 is covered by the sidewall portion 32 of the inner box member 30 and the sidewall portion 46 of the inner box member 40. Substantially the entirety of the sidewall portion 16 is covered by the sidewall portion 42 of the inner box member 40 and the sidewall portion 26 of the inner box member 20. Substantially the entirety of the sidewall portion 18 is covered by the sidewall portion 52 of the inner box member 50 and the sidewall portion 36 of the inner box member 30.

Accordingly, in the present embodiment, the distance between the sidewall portion 16 and the sidewall portion 18 in the outer box member 10 is substantially equal to the sum of the horizontal length of each of the sidewall portions 22 and 24 of the inner box member 20 (each of the sidewall portions 32 and 34 of the inner box member 30) and the horizontal length of each of the sidewall portions 56 and 58 of the inner box member 50 (each of the sidewall portions 46 and 48 of the inner box member 40). Also, the distance between the sidewall portion 12 and the sidewall portion 14 in the outer box member 10 is substantially equal to the sum of the horizontal length of each of the sidewall portions 42 and 44 of the inner box member 40 (each of the sidewall portions 52 and 54 of the inner box member 50) and the horizontal length of each of the sidewall portions 26 and 28 of the inner box member 20 (each of the sidewall portions 36 and 38 of the inner box member 30).

Figure 13:
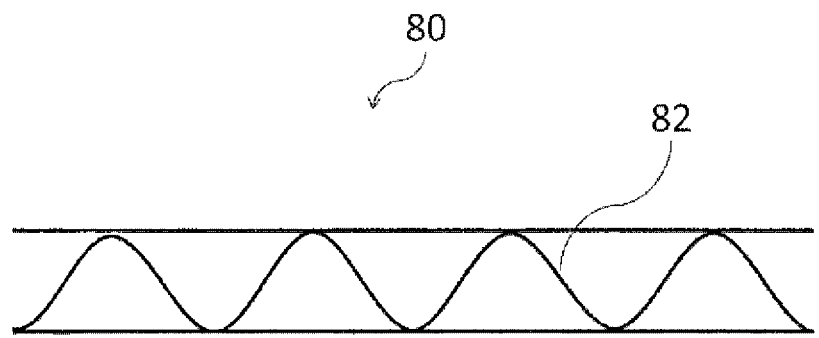
FIG. 13 is a diagram illustrating a structure of corrugated board.

In the case where the outer box member 10 is made of corrugated board, it is preferable that the direction of corrugations of the inner core of the sidewall portions 12, 14, 16 and 18 is parallel to the height direction of the sidewall portions 12, 14, 16 and 18. That is, as shown in a side view in FIG. 13, corrugated board 80 has a corrugated inner core 82, and the direction of corrugations of the inner core 82 (the direction perpendicular to the plane of paper) is preferably parallel to the height direction of the sidewall portions 12, 14, 16 and 18.

In the case where the inner box member 20 is made of corrugated board as well, the direction of corrugations of the inner core of the sidewall portions 22, 24, 26 and 28 is preferably parallel to the height direction of the sidewall portions 22, 24, 26 and 28. The same applies to the inner box members 30, 40 and 50.

In the ready-to-assemble toilet 1, the top portions 29, 39, 49 and 59 of the inner box members 20, 30, 40 and 50 together function as a toilet seat. A space S1 between the inner box member 20 and the inner box member 30 (the space surrounded by the inner box members 20, 30, 40 and 50) is used to collect excrement. Before the ready-to-assemble toilet 1 is used, a bag (not shown) for accommodating excrement is provided in the space S1. The bag can be, for example, a polyethylene bag. Preferably, the bag contains an excrement treatment material that absorbs excrement.

Advantageous effects of the ready-to-assemble toilet 1 will be described. In the ready-to-assemble toilet 1, the inner box members 20 and 30 are arranged so as to be spaced apart from each other and respectively face the sidewall portions 12 and 14 of the outer box member 10. In other words, the inner box members 20 and 30 are arranged on opposite sides in the outer box member 10 with the space S1 for collecting excrement interposed therebetween. Accordingly, the sidewall portions 22 and 24 of the inner box member 20 and the sidewall portion 12 of the outer box member 10 together constitute a sidewall (the left sidewall in FIG. 1) of the ready-to-assemble toilet 1. Likewise, the sidewall portions 32 and 34 of the inner box member 30 and the sidewall portion 14 of the outer box member 10 together constitute a sidewall (the right sidewall in FIG. 1) of the ready-to-assemble toilet 1. By configuring the sidewalls on laterally opposite sides to have a three-wall structure as described above, the strength of the ready-to-assemble toilet 1 can be remarkably enhanced.

Furthermore, in the ready-to-assemble toilet 1, the inner box members 40 and 50 are also arranged so as to be spaced apart from each other and respectively face the sidewall portions 16 and 18 of the outer box member 10. In other words, the inner box members 40 and 50 are arranged on opposite sides in the outer box member 10 with the space S1 for collecting excrement interposed therebetween. Accordingly, the sidewall portions 42 and 44 of the inner box member 40 and the sidewall portion 16 of the outer box member 10 together constitute a sidewall (the front sidewall in FIG. 1) of the ready-to-assemble toilet 1. Likewise, the sidewall portions 52 and 54 of the inner box member 50 and the sidewall portion 18 of the outer box member 10 together constitute a sidewall (the back sidewall in FIG. 1) of the ready-to-assemble toilet 1. In this way, by configuring the four sidewalls of the ready-to-assemble toilet 1 to have a three-wall structure, the strength of the ready-to-assemble toilet 1 can be further improved.

Figure 14:
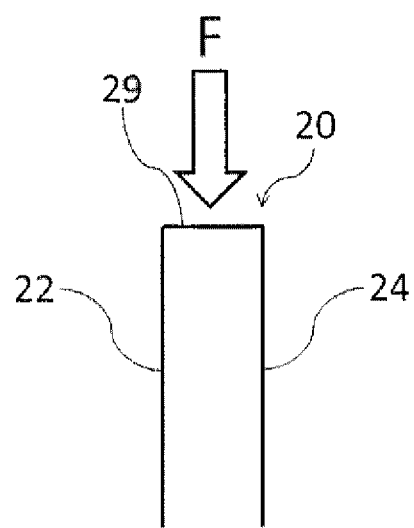
FIG. 14 is a diagram illustrating an advantageous effect of the ready-to-assemble toilet shown in FIG. 1.

The inner box member 20 includes the top portion 29. Thus, the sidewall portions 22 and 24 are connected to each other at their upper ends via the top portion 29. With this configuration, as shown in FIG. 14, even when a force F is applied to the inner box member 20 from above by a user being seated on the ready-to-assemble toilet 1, the distance between the sidewall portion 22 and the sidewall portion 24 is held constant, and thus the vertically upright state of the sidewall portions 22 and 24 is likely to be maintained. For this reason, the sidewall portions 22 and 24 can receive the force F from a direction parallel to the plane of the sidewall portions 22 and 24, and thus easily exert strength against the force F.

Figure 15:
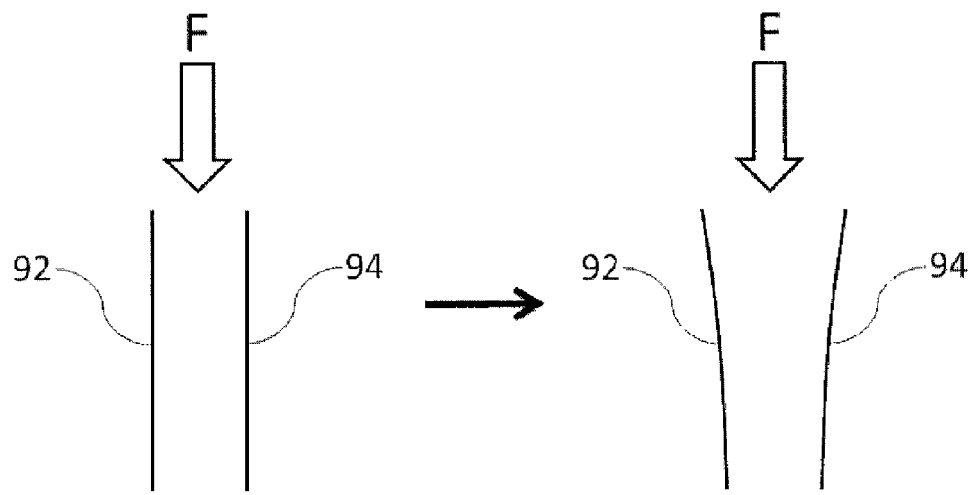
FIG. 15 is a diagram illustrating an advantageous effect of the ready-to-assemble toilet shown in FIG. 1.

In contrast, in the case of a structure as shown in FIG. 15 in which sidewall portions 92 and 94 are not connected to each other at their upper ends, application of a force F easily causes the distance between the sidewall portion 92 and the sidewall portion 94 to be changed, and thus the vertically upright state of the sidewall portions 92 and 94 is unlikely to be maintained. This causes the sidewall portions 92 and 94 to receive the force F from a diagonal direction with respect to the plane of the sidewall portions 92 and 94, and thus strength against the force F is unlikely to be exerted.

As described above, in the ready-to-assemble toilet 1, the inner box member 20 that constitutes a part of a sidewall has the top portion 29 in addition to the sidewall portions 22 and 24. This configuration advantageously serves to enhance the strength of the ready-to-assemble toilet 1. The same applies to the inner box members 30, 40 and 50.

Also, the inner box member 20 includes the sidewall portions 26 and 28. Accordingly, the force applied by a user being seated on the ready-to-assemble toilet 1 is dispersed, and thus the force applied to each of the sidewall portions 22, 24, 26 and 28 can be reduced. The presence of the sidewall portions 26 and 28 contributes to maintaining the distance between the sidewall portion 22 and the sidewall portion 24 constant. This advantageously serves to enhance the strength of the ready-to-assemble toilet 1 as described in connection with FIG. 14. Furthermore, in the present embodiment, because the inner box member 20 also includes the bottom portion 21, the distance between the sidewall portion 22 and the sidewall portion 24 is more easily maintained. The same applies to the inner box members 30, 40 and 50.

In the ready-to-assemble toilet 1, the top portions 29, 39, 49 and 59 of the inner box members 20, 30, 40 and 50 together function as a toilet seat. Accordingly, it is unnecessary to provide an additional member that functions as a toilet seat, and thus the structure of the ready-to-assemble toilet 1 can be simplified. Also, from the viewpoint of ease of use as a toilet seat, it is preferable that the top portion 29 of the inner box member 20 has a width (the horizontal length of each of the sidewall portions 26 and 28) of 5 cm or more and 15 cm or less, more preferably 8 cm or more and 12 cm or less. The same applies to the inner box members 30, 40 and 50.

The ready-to-assemble toilet 1 is composed of the outer box member 10 and the inner box members 20, 30, 40 and 50. The ready-to-assemble toilet 1 can be obtained by combining a plurality of box-shaped members, and thus ease of assembly can be provided. Also, the ready-to-assemble toilet 1 as a whole is box-shaped, and thus is advantageous in that splashing of excrement out of the toilet is unlikely to occur.

As shown in FIG. 2, the inner box members 20, 30, 40 and 50 are point-symmetrically arranged in the outer box member 10 as viewed from above. With this arrangement, the inner box members 20, 30, 40 and 50 mutually function as stoppers, thus preventing the inner box members 20, 30, 40 and 50 from moving within the outer box member 10.

The outer box member 10 and the inner box members 20, 30, 40 and 50 are made of corrugated board or cardboard. Accordingly, the ready-to-assemble toilet 1 can be easily discarded. In addition, corrugated board and cardboard are relatively light-weight, and thus ease of transport and transfer of the ready-to-assemble toilet 1 before and after assembly thereof can be achieved. Particularly when the outer box member 10 and the inner box members 20, 30, 40 and 50 are made of corrugated board, the ready-to-assemble toilet 1 having an excellent deodorizing effect can be implemented.

The outer box member 10 and the inner box members 20, 30, 40 and 50 before being assembled are each formed from a single sheet of flat corrugated board or cardboard. Accordingly, it is possible to save on storage space for the ready-to-assemble toilet 1 before being assembled.

The inner box member 20 includes the reinforcing portions 23a and 23b provided to overlap the sidewall portion 22, and the reinforcing portions 25a and 25b provided to overlap the sidewall portion 24. With this configuration, it is possible to further enhance the strength of the inner box member 20 and eventually the strength of the ready-to-assemble toilet 1. The same applies to the inner box members 30, 40 and 50.

In the inner box member 20, the horizontal length of each of the sidewall portions 22 and 24 is longer than the horizontal length of each of the sidewall portions 26 and 28. This configuration in which the sidewall portions 22 and 24 that constitute a three-wall structured sidewall together with the sidewall portion 12 of the outer box member 10 have a longer length is advantageous in enhancing the strength of the ready-to-assemble toilet 1. The same applies to the inner box members 30, 40 and 50.

The inner box member 20 is arranged in the outer box member 10 so as to be in contact with the sidewall portion 12 of the outer box member 10. Accordingly, the strength of the ready-to-assemble toilet 1 can be enhanced as compared to the configuration in which the inner box member 20 is spaced apart from the sidewall portion 12. The same applies to the inner box members 30, 40 and 50.

The inner box member 20 and the inner box member 30 have a substantially equal shape and size. Accordingly, it is unnecessary to make a distinction between the inner box members 20 and 30 when handling them at the time of assembly of the ready-to-assemble toilet 1, and thus ease of assembly can be achieved. In addition, identical members can be used as the inner box members 20 and 30, and thus the manufacturing cost of the ready-to-assemble toilet 1 can be reduced.

The inner box member 40 and the inner box member 50 have a substantially equal shape and size. Accordingly, it is unnecessary to make a distinction between the inner box members 40 and 50 when handling them at the time of assembly of the ready-to-assemble toilet 1, and thus ease of assembly can be achieved. In addition, identical members can be used as the inner box members 40 and 50, and thus the manufacturing cost of the ready-to-assemble toilet 1 can be reduced.

The outer box member 10 includes the top portion 19 that functions as a lid of the ready-to-assemble toilet 1. Accordingly, the ready-to-assemble toilet 1 with a lid can be implemented with a simple configuration. In addition, providing the lid prevents the odor of excrement in the space S1 of the ready-to-assemble toilet 1 after use from escaping to the outside of the ready-to-assemble toilet 1. Furthermore, when the ready-to-assemble toilet 1 is not used as a toilet, by using the lid (the top portion 19) in a closed state as a seating surface, the ready-to-assemble toilet 1 can be suitably used as a seat.

In the case where the outer box member 10 is made of corrugated board, it is advantageous to make the direction of corrugations of the inner core of the sidewall portions 12, 14, 16 and 18 parallel to the height direction of the sidewall portions 12, 14, 16 and 18 in order to enhance the strength of the ready-to-assemble toilet 1. That is, a user is seated on the ready-to-assemble toilet 1 while in use, and thus it mostly receives a heightwise (vertical) force. Because corrugated board is tough particularly against the force in the direction of corrugations of the inner core thereof, by aligning the direction of corrugations with the height direction, the strength of the ready-to-assemble toilet 1 against the heightwise force can be enhanced. The same applies to the inner box members 20, 30, 40 and 50.

The ready-to-assemble toilet according to the present invention is not limited to the above embodiment, and it is possible to make various modifications. For example, the embodiment given above illustrated an example in which the outer box member 10 includes the top portion 19, but the outer box member 10 does not necessarily need to include the top portion 19.

The embodiment given above illustrated an example in which each of the inner box members (the inner box members 20, 30, 40 and 50) has a bottom portion (the bottom portions 21, 31, 41 and 51). However, each of the inner box members does not necessarily need to include a bottom portion. Likewise, each of the inner box members does not necessarily need to include reinforcing portions.

The embodiment given above illustrated an example in which a pair of inner box members 20 and 30 and another pair of inner box members 40 and 50 have different sizes (see FIG. 2). However, the inner box members 20, 30, 40 and 50 may have a substantially equal shape and size. In this case, it is unnecessary to make a distinction between the inner box members 20, 30, 40 and 50 when handling them at the time of assembly of the ready-to-assemble toilet 1, and thus even more ease of assembly can be achieved. In addition, identical members can be used as the inner box members 20, 30, 40 and 50, and thus the manufacturing cost of the ready-to-assemble toilet 1 can be further reduced.

Figure 16:
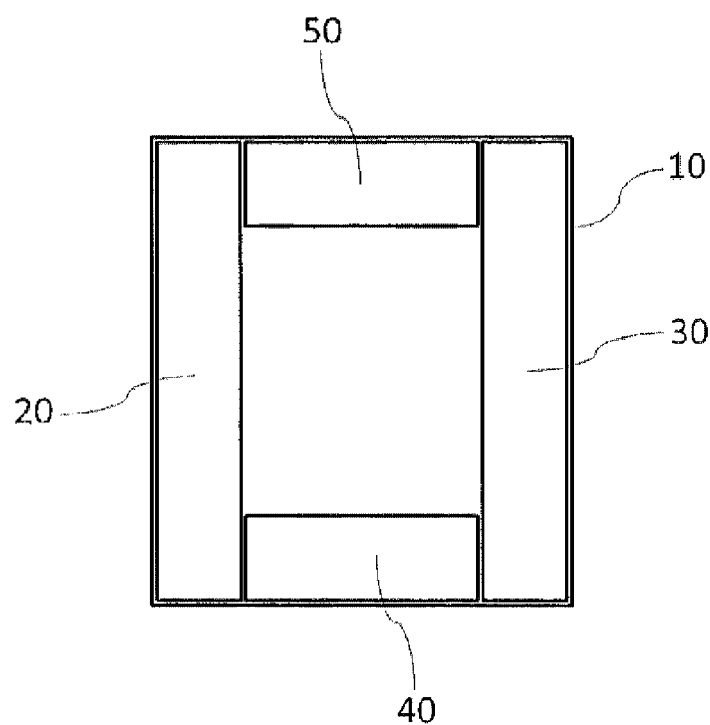
FIG. 16 is a plan view of a ready-to-assemble toilet according to a variation.

The embodiment given above illustrated an example in which the inner box members 20, 30, 40 and 50 are point-symmetrically arranged as viewed from above. However, the inner box members 20, 30, 40 and 50 may be line-symmetrically arranged as viewed from above as shown in FIG. 16. In this diagram, the inner box members 20, 30, 40 and 50 are arranged so as to be up-down symmetric and left-right symmetric.

The embodiment given above illustrated an example in which four inner box members 20, 30, 40 and 50 are provided. However, among the inner box members 20, 30, 40 and 50, only the inner box members 20 and 30 may be provided. In this case, it is preferable that the horizontal length of each of the sidewall portions 22 and 24 of the inner box member 20 is substantially equal to the horizontal length of each of the sidewall portions 12 and 14 of the outer box member 10. The same applies to the inner box member 30.

What is claimed is:

1. A ready-to-assemble toilet comprising:
an outer box member that is made of corrugated board or cardboard and includes a bottom portion, a first sidewall portion, a second sidewall portion that faces the first sidewall portion, a third sidewall portion, and a fourth sidewall portion that faces the third sidewall portion; and
a first inner box member and a second inner box member that are made of corrugated board or cardboard and which both include a first sidewall portion, a second sidewall portion that faces the first sidewall portion, a third sidewall portion, a fourth sidewall portion that faces the third sidewall portion, and a top portion that connects a whole upper end of the first sidewall portion and a whole upper end of the second sidewall portion to each other,
wherein the first and second inner box members have a height that is substantially equal to a height of the outer box member,
the first inner box member is arranged in the outer box member such that the first sidewall portion thereof faces the first sidewall portion of the outer box member,
the second inner box member is arranged in the outer box member such that the first sidewall portion thereof faces the second sidewall portion of the outer box member,
the first and second inner box members are spaced apart from each other in the outer box member, and
a space between the first inner box member and the second inner box member is configured to receive excrement.

2. The ready-to-assemble toilet according to claim 1, wherein the top portions of the first and second inner box members function as a toilet seat.

3. The ready-to-assemble toilet according to claim 1, wherein in the first inner box member, the first and second sidewall portions have a horizontal length longer than a horizontal length of the third and fourth sidewall portions, and
in the second inner box member, the first and second sidewall portions have a horizontal length longer than a horizontal length of the third and fourth sidewall portions.

4. The ready-to-assemble toilet according to claim 1, wherein each of the first and second inner box members includes a bottom portion.

5. The ready-to-assemble toilet according to claim 1, wherein the first and second inner box members are arranged in the outer box member so as to be in contact respectively with the first and second sidewall portions of the outer box member.

6. The ready-to-assemble toilet according to claim 1, wherein the first and second inner box members have a substantially equal shape and size.

7. The ready-to-assemble toilet according to claim 1, wherein the outer box member and the first and second inner box members are each formed from a single sheet of flat corrugated board or cardboard.

8. The ready-to-assemble toilet according to claim 1, wherein the outer box member is made of corrugated board having a corrugated inner core, and a direction of corrugations of the inner core of each of the sidewall portions of the outer box member is parallel to a height direction of the sidewall portions.

9. The ready-to-assemble toilet according to claim 1, wherein the first and second inner box members are made of corrugated board having a corrugated inner core, and a direction of corrugations of the inner core of each of the sidewall portions of the first and second inner box members is parallel to a height direction of the sidewall portions.

10. A ready-to-assemble toilet comprising:
an outer box member that is made of corrugated board or cardboard and includes a bottom portion, a first sidewall portion, a second sidewall portion that faces the first sidewall portion, a third sidewall portion, and a fourth sidewall portion that faces the third sidewall portion; and
a first inner box member and a second inner box member that are made of corrugated board or cardboard and which both include a first sidewall portion, a second sidewall portion that faces the first sidewall portion, a third sidewall portion, a fourth sidewall portion that faces the third sidewall portion, and a top portion,
wherein the first and second inner box members have a height that is substantially equal to a height of the outer box member,
the first inner box member is arranged in the outer box member such that the first sidewall portion thereof faces the first sidewall portion of the outer box member,
the second inner box member is arranged in the outer box member such that the first sidewall portion thereof faces the second sidewall portion of the outer box member,
the first and second inner box members are spaced apart from each other in the outer box member,
a space between the first inner box member and the second inner box member is configured to receive excrement, and
each of the first and second inner box members includes a first reinforcing portion provided to overlap the first sidewall portion, and a second reinforcing portion provided to overlap the second sidewall portion.

11. The ready-to-assemble toilet according to claim 10, wherein in each of the first and second inner box members, substantially the entirety of the first sidewall portion is covered by the first reinforcing portion, and substantially the entirety of the second sidewall portion is covered by the second reinforcing portion.

12. A ready-to-assemble toilet comprising:
an outer box member that is made of corrugated board or cardboard and includes a bottom portion, a first sidewall portion, a second sidewall portion that faces the first sidewall portion, a third sidewall portion, and a fourth sidewall portion that faces the third sidewall portion;
a first inner box member and a second inner box member that are made of corrugated board or cardboard and which both include a first sidewall portion, a second sidewall portion that faces the first sidewall portion, a third sidewall portion, a fourth sidewall portion that faces the third sidewall portion, and a top portion; and
a third inner box member and a fourth inner box member that are made of corrugated board or cardboard and which both include a first sidewall portion, a second sidewall portion that faces the first sidewall portion, a third sidewall portion, a fourth sidewall portion that faces the third sidewall portion, and a top portion,
wherein the first and second inner box members have a height that is substantially equal to a height of the outer box member,
the first inner box member is arranged in the outer box member such that the first sidewall portion thereof faces the first sidewall portion of the outer box member,
the second inner box member is arranged in the outer box member such that the first sidewall portion thereof faces the second sidewall portion of the outer box member,
the first and second inner box members are spaced apart from each other in the outer box member,
the third and fourth inner box members have a height that is substantially equal to the height of the outer box member,
the third inner box member is arranged in the outer box member such that the first sidewall portion thereof faces the third sidewall portion of the outer box member,
the fourth inner box member is arranged in the outer box member such that the first sidewall portion thereof faces the fourth sidewall portion of the outer box member,
the third and fourth inner box members are spaced apart from each other in the outer box member, and
a space surrounded by the first to fourth inner box members is configured to receive excrement.

13. The ready-to-assemble toilet according to claim 12, wherein the top portions of the third and fourth inner box members function as a toilet seat.

14. The ready-to-assemble toilet according to claim 12, wherein in the third inner box member, the first and second sidewall portions have a horizontal length longer than a horizontal length of the third and fourth sidewall portions, and
in the fourth inner box member, the first and second sidewall portions have a horizontal length longer than a horizontal length of the third and fourth sidewall portions.

15. The ready-to-assemble toilet according to claim 12, wherein each of the third and fourth inner box members has a bottom portion.

16. The ready-to-assemble toilet according to claim 12, wherein the third and fourth inner box members are arranged in the outer box member so as to be in contact respectively with the third and fourth sidewall portions of the outer box member.

17. The ready-to-assemble toilet according to claim 12, wherein the third and fourth inner box members have a substantially equal shape and size.

18. The ready-to-assemble toilet according to claim 12, wherein the third and fourth inner box members are each formed from a single sheet of flat corrugated board or cardboard.

19. The ready-to-assemble toilet according to claim 12, wherein the first to fourth inner box members have a substantially equal shape and size.

20. The ready-to-assemble toilet according to claim 12, wherein the first inner box member is arranged in the outer box member such that the third sidewall portion thereof is in contact with the third sidewall portion of the outer box member, and the fourth sidewall portion thereof is in contact with the second sidewall portion of the fourth inner box member, the second inner box member is arranged in the outer box member such that the third sidewall portion thereof is in contact with the fourth sidewall portion of the outer box member, and the fourth sidewall portion thereof is in contact with the second sidewall portion of the third inner box member, the third inner box member is arranged in the outer box member such that the third sidewall portion thereof is in contact with the second sidewall portion of the outer box member, and the fourth sidewall portion thereof is in contact with the second sidewall portion of the first inner box member, and the fourth inner box member is arranged in the outer box member such that the third sidewall portion thereof is in contact with the first sidewall portion of the outer box member, and the fourth sidewall portion thereof is in contact with the second sidewall portion of the second inner box member.

21. The ready-to-assemble toilet according to claim 12, wherein the third and fourth inner box members are made of corrugated board having a corrugated inner core, and a direction of corrugations of the inner core of each of the sidewall portions of the third and fourth inner box members is parallel to a height direction of the sidewall portions.

22. The ready-to-assemble toilet according to claim 12, wherein each of the third and fourth inner box members includes a first reinforcing portion provided to overlap the first sidewall portion, and a second reinforcing portion provided to overlap the second sidewall portion.

23. The ready-to-assemble toilet according to claim 22, wherein in each of the third and fourth inner box members, substantially the entirety of the first sidewall portion is covered by the first reinforcing portion, and substantially the entirety of the second sidewall portion is covered by the second reinforcing portion.

24. The ready-to-assemble toilet according to claim 12, wherein the first to fourth inner box members are arranged along the first to fourth sidewall portions of the outer box member with substantially no space therebetween.

25. The ready-to-assemble toilet according to claim 1, wherein the outer box member includes a top portion that functions as a lid of the ready-to-assemble toilet.

* * * * *